United States Patent [19]

Fidel

[11] Patent Number: 4,622,634
[45] Date of Patent: Nov. 11, 1986

[54] PARALLEL PROCESSING OF SIMULTANEOUS ULTRASOUND VECTORS

[75] Inventor: Howard F. Fidel, Hartsdale, N.Y.

[73] Assignee: Irex Corporation, Ramsey, N.Y.

[21] Appl. No.: 476,672

[22] Filed: Mar. 18, 1983

[51] Int. Cl.⁴ .................. G01S 7/52; G01S 7/62; G06F 13/00; G06F 15/42

[52] U.S. Cl. ................... 364/414; 73/626; 128/660; 364/200

[58] Field of Search .............. 364/414, 200 MS File, 364/900 MS File; 358/112, 140; 343/5 SC; 367/11, 113; 128/660; 73/626

[56] References Cited

U.S. PATENT DOCUMENTS

| | | | |
|---|---|---|---|
| 4,121,250 | 10/1978 | Huelsman | 358/140 |
| 4,135,140 | 1/1979 | Buchner | 73/626 X |
| 4,254,467 | 3/1981 | Davis et al. | 364/521 |
| 4,257,256 | 3/1981 | Yoshikawa | 73/626 |
| 4,424,561 | 1/1984 | Stanley et al. | 364/200 |
| 4,435,765 | 3/1984 | Uchida et al. | 364/200 |
| 4,443,862 | 4/1984 | Buchner et al. | 364/900 |
| 4,445,172 | 4/1984 | Peters et al. | 364/200 |
| 4,449,199 | 5/1984 | Daigle | 364/900 |

OTHER PUBLICATIONS

European Patent Application Search Report No. 123,411 Published Oct. 31, 1984, Based on Application No. 84301795.

Swanson, R. C. "Interconnections for Parallel Memories to Unscramble p-Ordered Vectors", *IEEE Transactions on Computers*, vol. C-23, No. 11, Nov. 1974, 1105-1115.

Van Voorhis, D. C. et al., "Memory Systems for Image Processing", IEEE Transactions on Computers, vol. C-27, No. 2, Feb. 1978, 113-125.

Primary Examiner—Jerry Smith
Assistant Examiner—Clark Jablon
Attorney, Agent, or Firm—W. Brinton Yorks, Jr.

[57] ABSTRACT

Apparatus and a method are provided for processing simultaneously produced vector information signals in an ultrasonic diagnostic imaging system. Two vector signals in the form of simultaneous sequences of digital words are alternately sampled and a sequence of interleaved words of the two simultaneous sequences is stored in consecutive locations of a memory. The words are then read out of the memory by first addressing even memory locations, then odd locations, to produce the two vector information signals in a serial sequence.

8 Claims, 4 Drawing Figures

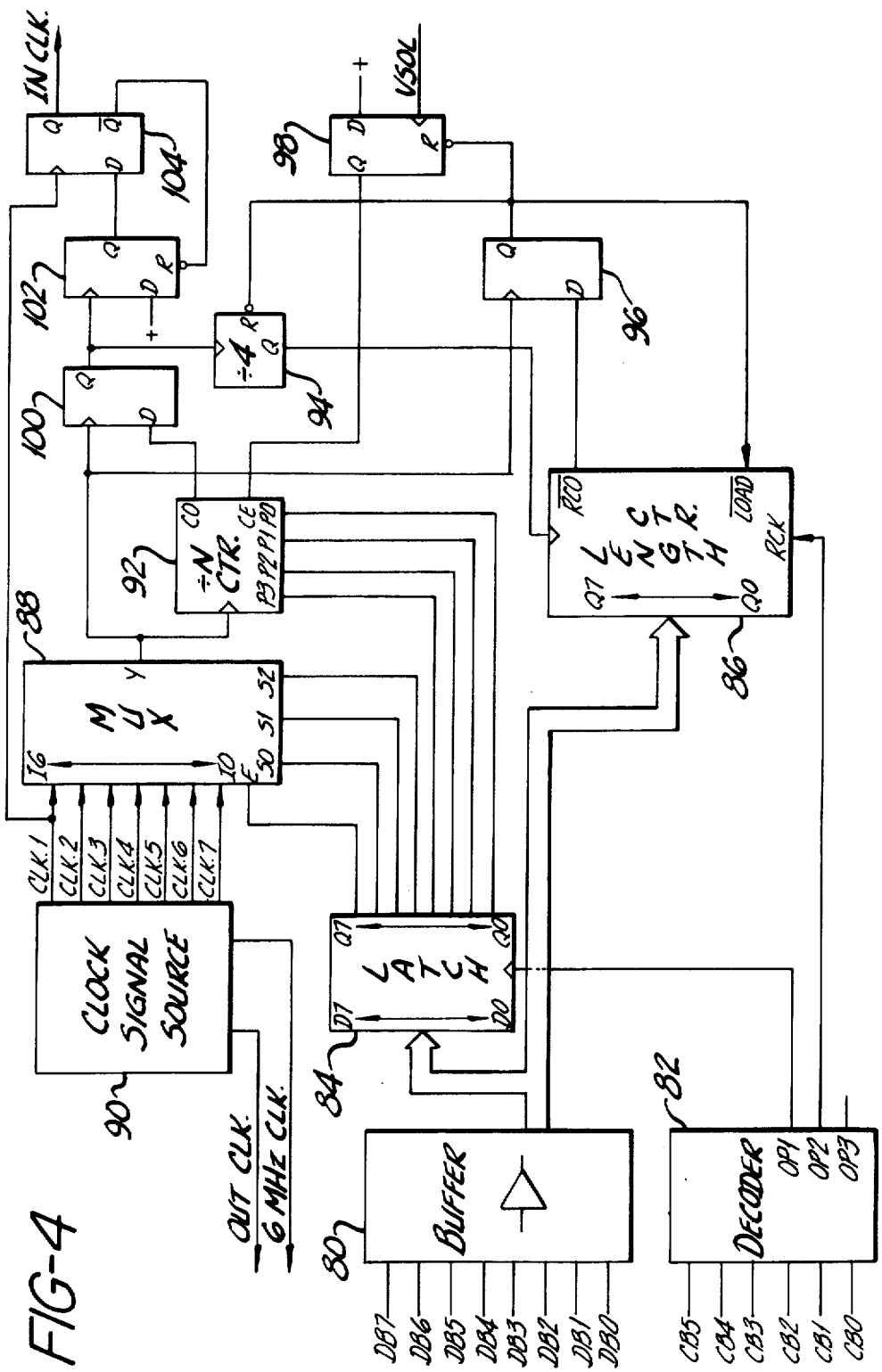

PARALLEL PROCESSING OF SIMULTANEOUS ULTRASOUND VECTORS

This invention relates to the parallel processing of simultaneous ultrasound vectors in an ultrasonic diagnostic imaging system and, in particular, to the parallel processing of simultaneous vectors for image display.

In an ultrasonic diagnostic imaging system, echo information from a patient's body is received by one or more ultrasonic transducers. A continuous stream of echo information from a given direction relative to the transducer plane comprises a line or vector of information. A number of these lines from different directions in a common plane may be combined to form an image of that tissue plane of the patient's body.

When a linear array of transducer elements is used to receive the echo information, the signals received by the elements are passed through signal delay paths of different lengths and combined to form an ultrasound vector. Vectors at different angles relative to the transducer array plane are obtained by passing the echo information from numerous ultrasound transmissions through differing combinations of delay paths.

Essentially the same result obtained from several transmissions can be produced by passing the echo information received from a single transmission through several combinations of delay paths at the same time. The delayed signals from the different combinations of delay paths are then combined by respective signal combining networks to produce several different ultrasound vectors simultaneously, a technique known as parallel processing. Techniques for delaying and combining echo information signals in parallel are described in British Patent Application No. 8,307,654, entitled "PARALLEL ULTRASONIC INFORMATION PROCESSING," filed on Mar. 18, 1983.

Once the ultrasound vectors have been received, they must be put into a form suitable for display. This is generally done by a digital scan converter in conventional ultrasound systems. The digital scan converter receives the vectors, which correspond to polar coordinate information, and converts the vector information into X-Y coordinate information suitable for display on a television screen. Present scan converters are only capable of processing one vector at a time, however. Thus, it is necessary to provide means for processing simultaneous vectors so that they can be sequentially applied to the scan converter with a minimal amount of circuitry which does not result in any loss of vector information.

In accordance with the principles of the present invention, a system is provided for processing simultaneous ultrasound vectors so that they may be sequentially entered into a scan converter. Two vectors, each comprising a sequence of digital words, are sampled in parallel, and stored in a first memory in a format in which the words of the two vectors are interleaved. At the same time, vector words are read from a second memory which has been loaded in the same manner by first reading out even address location words comprising one vector, and then reading out odd address location words comprising the other vector. The sequentially read vector information is entered into the scan converter. After the process is completed the system switches to simultaneously load the second memory with new vector words and read the previously stored vector words from the first memory. In a preferred embodiment of the present invention the data rates and lengths of the parallel vectors are variable in accordance with the depth and size of the image of the patient's body and the output data rate is constant in accordance with the performance characteristics of the scan converter.

In the Drawings:

FIG. 4 illustrates circuitry for producing the clock signals for the arrangements of FIGS. 1-3.

Figure 1:
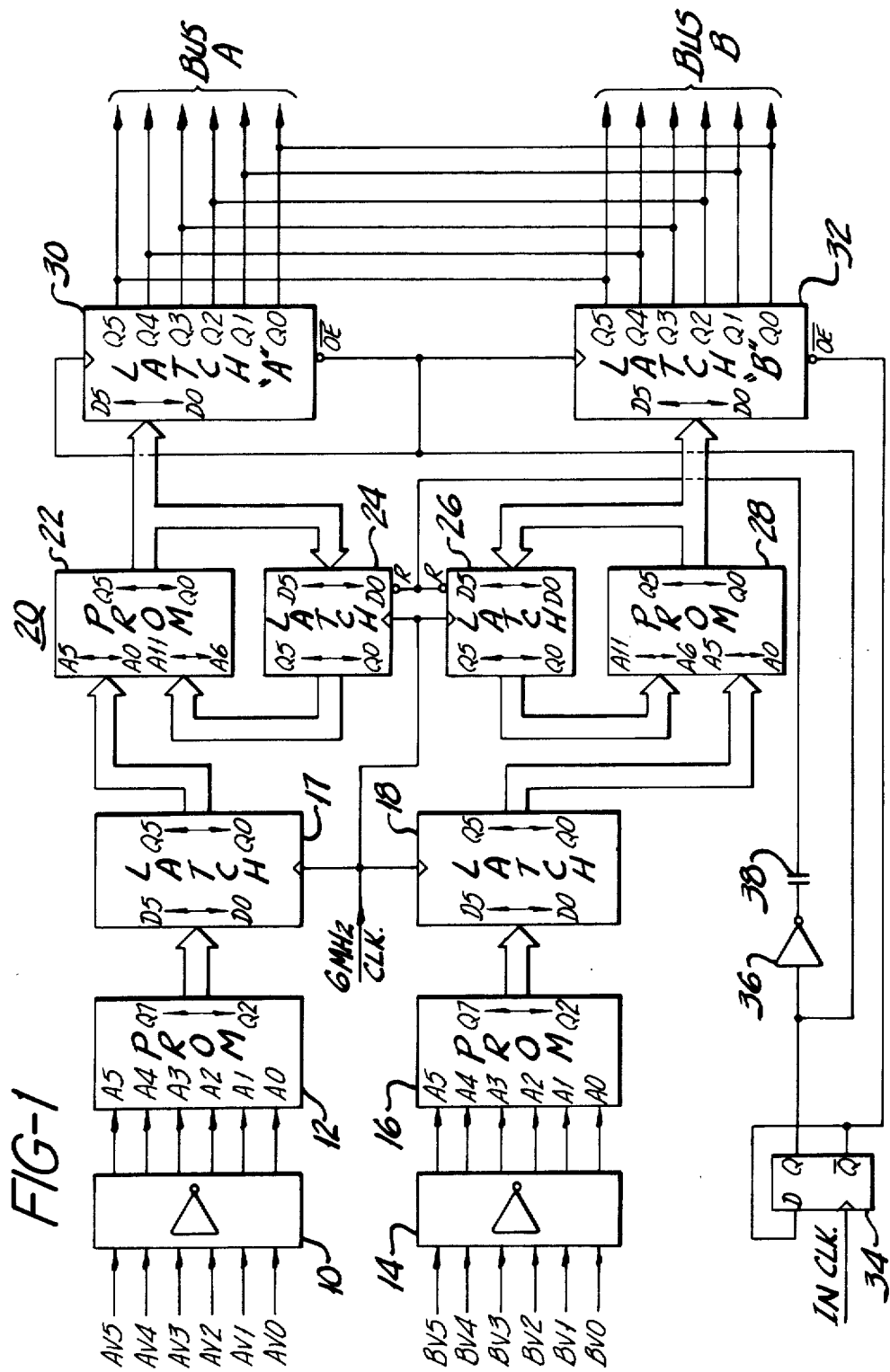
FIG. 1 illustrates in block diagram form, an input circuit for receiving parallel ultrasound vector information.

Referring to FIG. 1, circuitry for processing two ultrasound vectors in parallel is shown in block diagram form. Words of an "A" vector consist of six bits, AV0-AV5, which are received by a buffer 10. A simultaneous "B" vector, also six bits in word length, is received by a buffer 14. The vector words are coupled from the buffers to the address inputs of programmable read-only-memories (PROM'S) 12 and 14. The PROM'S may be used to compress or expand the vector word data over certain parts of their dynamic range, or may be used to convert the six-bit words to words of other bit lengths in the event that the scan converter used does not accept six-bit words. In this example it will be assumed that no conversion is done by the PROM's, and that the six-bit A and B vector words produced by PROM's 12 and 14 are latched into respective latches 17 and 18 by a 6 MHz clock.

The vector words are then applied to a peak or average detector 20. Each vector word is applied to some of the address bits of PROM's 22 and 28, respectively, along with data from respective latches 24 and 26. Each PROM 22 and 28 then produces an output word which is the peak or the average value of the two words at the address inputs, depending upon the program data. The PROM output words are latched into the latches 24 and 26 by the 6 MHz clock, and the latched words are applied to the PROM address inputs. The latches will thus always hold the peak or average value of the applied data until such time as they reset, which values will likewise be produced by the PROM's 22 and 28 and applied to the inputs of latches 30 and 32.

An input clock signal, identified as INCLK, is applied to the clock input of a flip-flop 34. The Q output of flip-flop 34 is connected to its D input so that the flip-flop 34 will divide the INCLK signal frequency by two. The Q output of flip-flop 34 is coupled to the clock inputs of latches 32 and 30 so that the leading edge of the Q output signal will load the peak- or average-detected A and B words into the latches simultaneously. The Q output of flip-flop 34 is also coupled to the output enable input of latch 30 so that the high Q output signal will put the latched A word on the Bus A and Bus B by enabling the tristate outputs of the latch 30. The $\overline{Q}$ output of latch 34 is coupled to the output enable input of latch 32 to put the B words on the Bus A and Bus B when the $\overline{Q}$ signal is high. The Q output signal of flip-flop 34 is also applied to the input of an inverter 36, the output of which is coupled by a capacitor 38 to the reset inputs of the latches 24 and 26. When the Q output signal goes high, a low-going spike is applied to the latches 24 and 26 to reset them at the occurrence of every other INCLK signal. The peak or average value detectors 20 will detect the peak or average of the vector words passing between the times that the PROM data is loaded into the latches 30 and 32 by the Q output signal of flip-flop 34.

Figure 2:
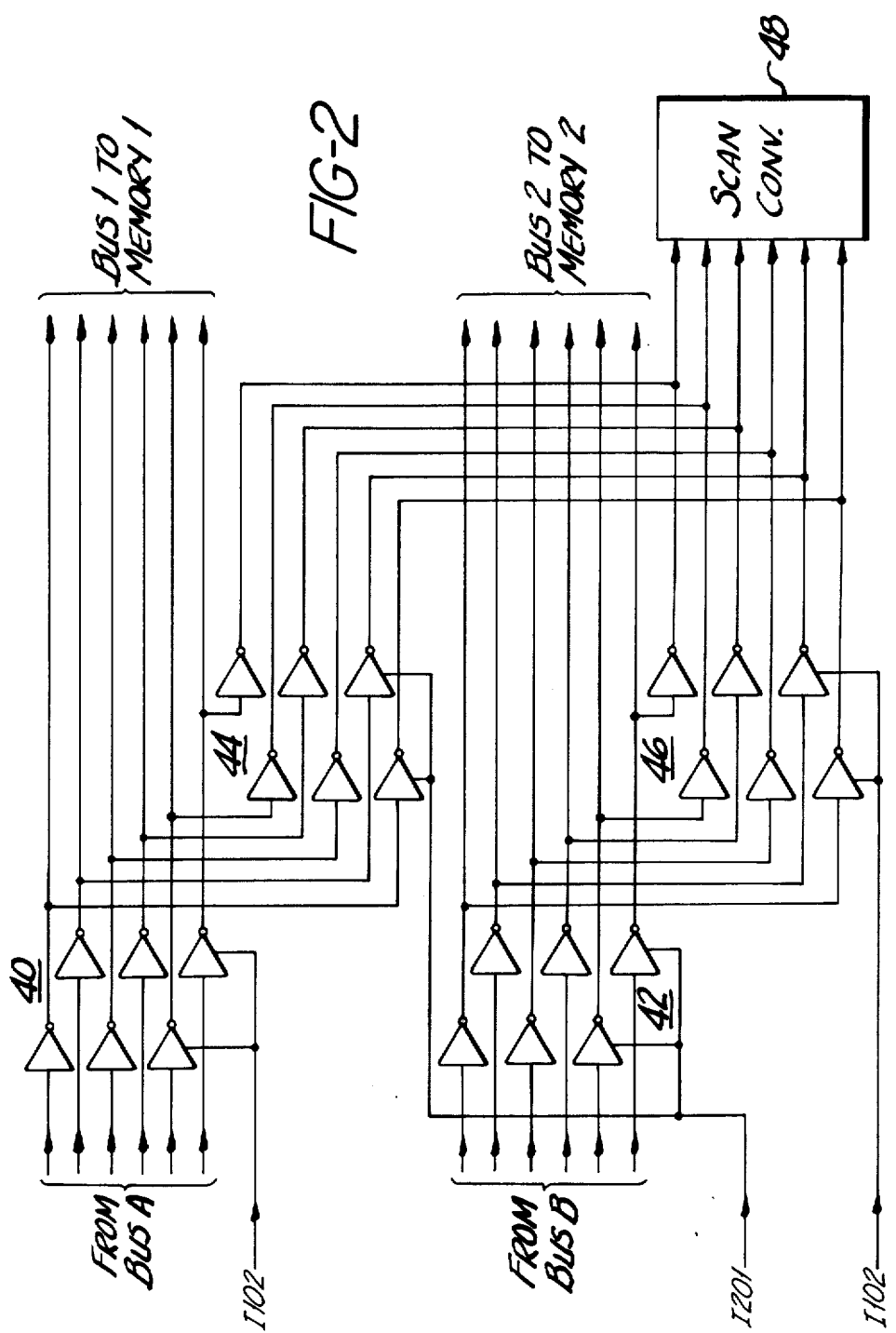
FIG. 2 illustrates a steering circuit for the parallel ultrasound vector information received by the arrangement of FIG. 1.

Buses A and B are coupled to tri-state gates, which conduct the vector words into and out of memories, as shown in FIG. 2. The gates shown at 40 are coupled to conduct vector word data from Bus A and Bus B to Bus 1 when the gates are enabled by the low state of control signal I102. The low condition of the I102 signal also enables the output gates shown at 46, which conduct vector words from memory Bus 2 to the inputs of a scan converter pre-processor 48. The gates shown at 42 couple vector words from Bus A and Bus to memory by way of Bus 2 when enabled by the low state of a control signal identified as I201. The low I201 signal also enables the output gates shown at 44, which couple data from BUS 1 and memory 1 to the inputs of the scan converter pre-processor 48.

Figure 3:
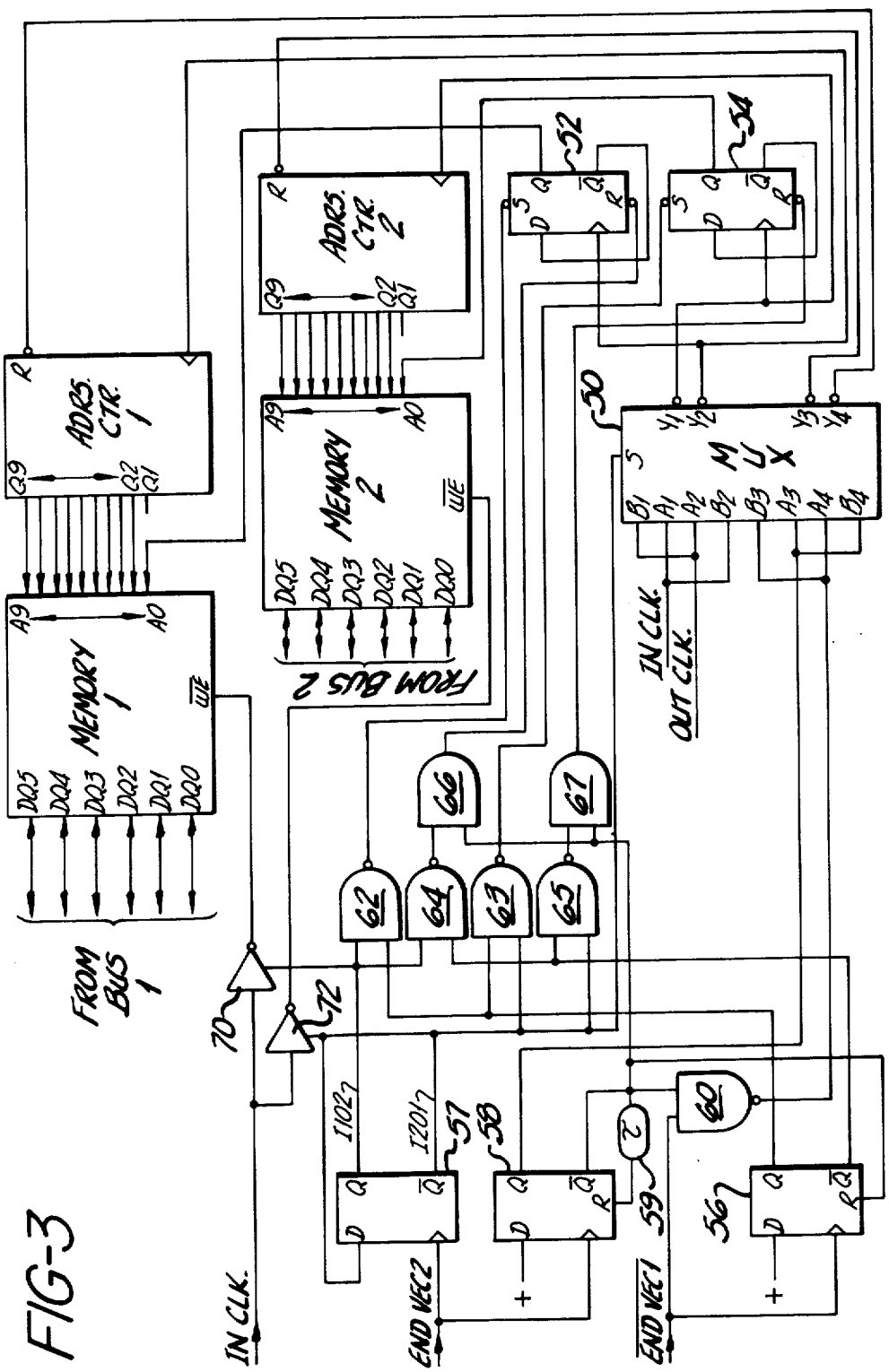
FIG. 3 illustrates in logic diagram form an arrangement for processing the parallel ultrasound vector information of FIGS. 1 AND 2 in accordance with the principles of the present invention.

Referring to FIG. 3, an arrangement for converting the parallel ultrasound vector words to a serial format for the scan converter is shown. Bus 1 of FIG. 2 is coupled to the input/output lines DQ0–DQ5 of a memory 1 and Bus 2 is coupled to the input/output lines of a memory 2. The least significant address bit AO of memory 1 is coupled to the Q output of a flip-flop 52 and the remaining address lines of memory 1 are coupled to the Q2–Q9 outputs of an address counter 1. The least significant address bit of memory 2 is coupled to the Q output of a flip-flop 54, and the remaining memory 2 address lines are coupled to the Q2–Q9 outputs of an address counter 2. An output clock signal, identified as OUTCLK, is coupled to the B1 and A2 inputs of a quad two-input inverting multiplexer 50, and the INCLK signal is coupled to the A1 and B2 inputs of the multiplexer 50. The Y1 output of the multiplexer 50 is coupled to the clock input of flip-flop 54 and to the clock input of address counter 2. The Y2 output of the multiplexer 50 is coupled to the clock inputs of flip-flop 52 and address counter 1. The Q outputs of each of flip-flops 52 and 54 are coupled to the respective D inputs of the flip-flops. The Y3 output of multiplexer 50 is coupled to the reset input of address counter 2, and the Y4 output of multiplexer 50 is coupled to the reset input of address counter 1.

A signal $\overline{ENDVEC1}$ is applied to the clock input of a flip-flop 56 and to an input of a NAND gate 60. A signal $\overline{ENDVEC2}$ is applied to the clock inputs of flip-flops 57 and 58. The I102 signal is produced at the Q output of flip-flop 57 and is applied to the control input of a tristate inverter 70 and inputs of NAND gates 62 and 64, as well as the control inputs of the gates shown at 40 and 46 in FIG. 2. The I201 signal is produced at the $\overline{Q}$ output of flip-flop 57, which is coupled to the D input of the flip-flop, the control input of a tri-state inverter 72, inputs of NAND gates 63 and 65, and the select input S of the multiplexer 50, as well as the gates shown at 42 and 44 in FIG. 2.

The Q output of flip-flop 58 is coupled to the A3 and B4 inputs of multiplexer 50. The $\overline{Q}$ output of flip-flop 58 is coupled to the reset input of the flip-flop by a delay element 59, to inputs of NAND gate 60 and AND gates 66 and 67, and to the reset input of flip-flop 56. The output of NAND gate 60 is coupled to the B3 and A4 inputs of multiplexer 50.

The Q output of flip-flop 56 is coupled to inputs of NAND gates 62 and 63, and the $\overline{Q}$ output of flip-flop 56 is coupled to inputs of NAND gates 64 and 65. The output of NAND gate 64 is coupled to an input of AND gate 66, and the output of NAND gate 65 is coupled to an input of AND gate 67. The output of NAND gate 62 is coupled to the set input of flip-flop 52 and the output of AND gate 66 is coupled to the reset input of flip-flop 52. The output of NAND gate 63 is coupled to the set input of flip-flop 54 and the output of AND gate 67 is coupled to the reset input of flip-flop 54. The output of inverter 70 is coupled to the write enable input of memory 1 and the output of inverter 72 is coupled to the write enable input of memory 2. The INCLK signal is applied to the inputs of inverters 70 and 72.

In operation, the arrangement of FIG. 3 writes alternate words of the A and B vectors into consecutive memory locations of one of the memories. This will result in the storage of the A vector words in consecutive even address memory locations, for instance, and the storage of B vector words at consecutive odd address memory locations. At the same time, vector information is read out of the other memory, which has previously been loaded in the same manner. Vector words are read first from sequential even address locations and sent to the scan converter pre-processor 48. This transmits the A vector words in sequence to the scan converter in this example. After all the A vector words have been transmitted, vector words are read from the odd address locations of the memory, which transmits the B vector information to the scan converter. After all the incoming A and B vector words have been stored in the first memory and the stored vectors read from the second memory, the system switches so that new information is written into the second memory and the previously stored vectors are read from the first memory and transmitted to the scan converter. The memories are ping-ponged in this manner until all vectors are stored in the scan converter for the construction and display of an ultrasound image.

To follow this example in greater detail, assume that flip-flop 57 is reset so that the I102 signal is low and that the I201 signal is high. The low I102 signal will assume control of the system to write data into memory 1 and read data out of memory 2. The I102 signal will enable gates 40 in FIG. 2 so that A and B vector words from alternately enabled latches 30 and 32 of FIG. 1 will be conducted into memory 1 by way of Bus 1. The I102 signal also enables gates 46 to conduct data words out of memory 2 by way of Bus 2 and into the scan converter preprocessor 48. The low I102 signal enables gate 70 so that the INCLK signal is applied to the write enable input of memory 1 to load data words into that memory. Tri-state gates controlled by the high I201 signal are disabled at this time.

The high I201 signal at the select input of multiplexer 50 connects the B inputs of the multiplexer to their respective Y outputs. The INCLK signal appears in inverted form at the Y2 output, which toggles flip-flop 52. The Q output signal of flip-flop 52 changes state with every INCLK pulse so that the least significant address line AO of memory 1 changes state in synchronism with the INCLK signal and the arrival of each new data word on BUS 1. The inverted INCLK signal at the Y2 output of the multiplexer 50 also clocks address counter 1, which addresses sequential locations of memory 1. The A and B vector words are thus written into sequential locations of memory 1 in an A, B, A, B, etc. format beginning with address location zero.

As the writing of words into memory 1 commences, the low I102 signal at the inputs of NAND gates 62 and 64 cause the outputs of these gates to be high. Flip-flop 58 is reset at this time, and the high Q output signal of flip-flop 58 produces high signals at respective inputs of AND gates 66 and 67. The high output signal of NAND gate 62 is applied to the set input of flip-flop 52, and the high output signal of NAND gate 64 is applied by way of AND gate 66 to the reset input of flip-flop 52, enabling flip-flop 52 to toggle with the inverted INCLK signal at its clock input.

Flip-flop 56 is reset at this time, and its outputs apply a low input signal to one input of NAND gate 63 and a high input signal to one input of NAND gate 65. NAND gate 63 thus applies a high signal to the set input of flip-flop 54. Because the I201 signal is high, the two high input signals of NAND gate 65 produce a low output signal for that gate, which low signal is applied to the reset input of flip-flop 54. Flip-flop 54 is thereby held in a reset state and applies a low signal to the least significant address bit AO of memory 2. The inverted OUTCLK signal at the Y1 output of the multiplexer 50 clocks the address counter 2, which reads vector words out of even address locations of memory 2. In this example, the A vector words at the even address locations would be read sequentially from memory 2 and transmitted to the scan converter pre-processor 48 by way of Bus 2 and gates 46.

When all the A vector words have been read from memory 2, the $\overline{\text{ENDVEC1}}$ signal goes low momentarily, which sets flip-flop 56 and produces a momentary high signal at the output of NAND gate 60. The signal from NAND gate 60 is applied to the B3 input of the multiplexer 50 and appears as a short low pulse at the Y3 output. This pulse resets address counter 2 back to zero. The low $\overline{Q}$ output signal of flip-flop 56 produces a high signal at the output of NAND gate 65, which is applied to the reset input of flip-flop 54. The high Q output signal of flip-flop 56 in combination with the high I201 signal produces a low signal at the output of NAND gate 63, which low signal is applied to the set input of flip-flop 54. Flip-flop 54 is now forced to apply a steady high signal to the least significant address bit AO of memory 2. The inverted OUTCLK signal at the Y1 output of the multiplexer 50 causes the address counter 2 to resume counting, and this time odd address locations are read in sequence. This reads out the B vector words, which are transmitted to the scan converter pre-processor.

When all the B vector words have been read from memory, an $\overline{\text{ENDVEC2}}$ pulse sets flip-flops 57 and 58. Flip-flop 58 is set only momentarily, because its Q output is connected to its reset input so that the flip-flop will reset itself after a delay of T. During the short time that flip-flop 58 is set, its low $\overline{Q}$ output signal is applied to the reset inputs of flip-flops 52 and 54 by way of AND gates 66 and 67, thereby resetting these two flip-flops to their initial condition. The high Q output signal of flip-flop 58 is applied to the B4 input of the multiplexer 50, which produces a low signal at the Y4 output to reset address counter 1 to zero. The low $\overline{Q}$ output signal of flip-flop 58 is conducted by way of NAND gate 60 and the B3 input of the multiplexer 50 to the Y3 output which resets the address counter 2 to zero.

When flip-flop 57 changes state, the states of the I102 and I201 signals change. This switches operation of the system so that the next arriving vector words will be written into memory 2, and the vector words previously written into memory 1 will be read out, even addresses first, and transmitted to the scan converter. The change of state of the I201 signal selects the A inputs of the multiplexer 50 so that the INCLK signal will be applied to address counter 2 and flip-flop 54, and the OUTCLK signal applied to address counter 1. Memory operation is switched back and forth in this manner by the toggling of flip-flop 57 until all of the parallel vectors have been transmitted sequentially to the scan converter.

Clock signals for a preferred embodiment of the present invention are provided by the arrangement of FIG. 4. Data bits DBO–DB7 from a controller (not shown) are applied by way of a buffer 80 to inputs of a latch 84 and a length counter 86. Control bits CBO–CB5 from the controller are applied to a decoder 82, which decodes the applied signals to produce operational control signals at outputs OP1 and OP2. The OP1 output is coupled to the clock input of latch 84 and the OP2 output is coupled to the RCK input of the length counter 86. Outputs QO–Q3 of the latch 84 are coupled to preset inputs PO–P3 of a divide-by-N counter 92, outputs Q4–Q6 of latch 84 are coupled to select inputs S0–S2 of a multiplexer 88, and latch output Q7 is coupled to the enable input of the multiplexer 88.

A clock signal source 90, including a crystal oscillator and a count-down chain of flip-flops, produces the OUTCLK signal and the 6 MHz clock signal for the arrangement of FIG. 1. The clock signal source 90 also produces a plurality of different frequency clock signals which are applied to inputs of the multiplexer 88. The CLK1 signal of the source 90 is also applied to the clock input of a flip-flop 104.

The Y output of the multiplexer 50 is coupled to the clock inputs of the divide-by-N counter 92 and flip-flops 100 and 96. The carry-out output of the counter 92 is coupled to the D input of flip-flop 100. The Q output of flip-flop 100 is coupled to the clock inputs of a flip-flop 102 and a divide-by-four counter 94. The Q output of flip-flop 102 is coupled to the D input of flip-flop 104 and the $\overline{Q}$ output of flip-flop 104 is coupled to the reset input of flip-flop 102. The INCLK signal is produced at the Q output of flip-flop 104.

The output of the divide-by-four counter 94 is coupled to the clock input of the length counter 86. The carry-out output $\overline{\text{RCO}}$ of the length counter 86 is coupled to the D input of flip-flop 96. The output of flip-flop 96 is coupled to the reset inputs of the divide-by-four counter 94 and a flip-flop 98, and to the load input of the length counter 86. A vector start signal VSOL is applied to the clock input of flip-flop 98. The output of flip-flop 98 is coupled to the counter enable input of the divide-by-N counter 92.

Pulses of the INCLK signal must necessarily be aligned in time with the arrival of the parallel A and B vector words. The frequency of the INCLK signal in the preferred embodiment is a function of the size of the image display and the depth of the vector in the patient's tissue. Three size clocks are available: a 24.6 MHz clock for a full size display, a 16.38 MHz clock for a two-thirds size display and an 8.19 MHz clock for a one-third size display. The appropriate size clock is chosen by the select signal lines of the multiplexer 88. The image depth in centimeters can range from four to twenty-four centimeters in increments of two centimeters. The image depth is accounted for by the value of N chosen by the preset input signals to the divide-by-N counter 92. The INCLK signal in the preferred embodiment follows the formula:

$$INCLK = \frac{Size\ Clock}{Depth\ in\ cm./2}$$

Finally, the length counter counts the INCLK pulses so that an INCLK pulse is produced for each vector word. Each vector can have a maximum length of 320 words, or a total of 640 words for two parallel vectors of maximum length. The length counter stops the INCLK signal when the appropriate number of pulses has been produced.

The sequence of operation of the arrangement of FIG. 4 is as follows. First, data bits DBO–DB7 arrive containing information as to the desired frequency of the size clock and the value of N. The control bits CBO–CB5 are decoded at this time to produce a pulse at the OP1 output of the decoder 82, which latches the size clock and N values into the latch 84. The multiplexer 88 then selects the proper size clock, which is produced at the Y output, and the proper N value is preset into the divide-by-N counter 92.

Next, data bits representing the vector length are applied to the buffer 80 and an OP2 control signal is decoded to load the vector length value into the length counter 86. System initialization is now complete, and the system awaits the arrival of a VSOL signal.

When the vector words are about to enter the system, the VSOL signal sets flip-flop 98. The Q output signal of flip-flop 98 enables the divide-by-N counter 92, which counts pulses of the size clock and produces pulses at regular intervals at its CO output. These pulses cause flip-flop 100 to be set, which aligns the pulses in time with the size clock pulses. The pulses produced by flip-flop 100 are then aligned in time with pulses of the high frequency signal CLK1 by flip-flops 102 and 104, the latter producing INCLK signal pulses of the desired pulse length, phase and frequency.

The pulses produced by flip-flop 100 clock the divide-by-four counter 94, which prescales the input clock signal frequency for the length counter 86. The length counter 86 counts the prescaled clock pulses until an appropriate number of pulses have been counted in accordance with the previously loaded length value. At that time a low-going carry-out signal is produced at the $\overline{RCO}$ output of the length counter. This signal causes flip-flop 96 to be reset by a size clock pulse, and the Q output of the flip-flop 96 goes low. This low signal resets the divide-by-four counter 94 and resets flip-flop 98. When flip-flop 98 is reset its Q output signal goes low, which disables the divide-by-N counter 92. The production of INCLK pulses then stops. The low Q output signal of flip-flop 96 is also applied to the load input of the length counter 86 so that the counter 86 is initialized and ready to begin counting the length of the next pair of vectors. Initialization of the length counter 86 also causes the $\overline{RCO}$ output of the counter to go high, which in turn causes flip-flop 96 to be clocked to a high output state by the next size clock pulse at its clock input. The system is now initialized and awaits the arrival of the next VSOL pulse.

If desired, the OUTCLK signal can be gated on and off under control of a second length counter for the production of an OUTCLK signal of a known number of pulses, in the same manner that the length counter 86 gates the INCLK signal.

What is claimed is:

1. In an ultrasonic diagnostic imaging system, apparatus for processing simultaneous first and second ultrasonic vector information signals, each of which comprises a sequence of digital words, comprising:

a first digital memory having an input and an output;

means, responsive to said simultaneous vector information signals, for alternately steering words of said first and second vector information signals to the input of said first memory;

first address means, coupled to said first memory, for addressing sequential locations of said first memory in synchronism with the arrival of words of vector information at said input of said first memory so as to load words of said respective vector information signals alternately into sequential memory locations;

control means, coupled to said first address means, for controlling said first address means to read vector information signal words from sequential even memory locations of said first memory and from sequential odd memory locations of said first memory; and a scan converter, coupled to said output of said first memory for receiving vector information signal words read from said first memory under control of said control means.

2. The arrangement of claim 1, further comprising:

a second digital memory having an input coupled to said steering means and an output coupled to said scan converter, wherein said steering means alternately steers words of said first and second vector information signals to the inputs of said first and second memories;

second address means, coupled to said second memory and to said control means, for addressing sequential locations of said first memory in synchronism with the arrival of words of vector information at said input of said second memory so as to load words of said respective vector information signals alternately into sequential memory locations, wherein said control means further controls said second address means to read vector information signal words from sequential even memory locations of said second memory and from sequential odd memory locations of said second memory, said control means alternating the operation of each memory between loading and reading cycles, whereby one memory is performing a loading operation while the other memory is performing a reading operation.

3. The arrangement of claim 2, wherein said first and second address means each includes a flip-flop having clock, set, and reset inputs and an output coupled to the least significant address bit of said respective memory, wherein each flip-flop is toggled by a clock signal at its clock input in synchronism with the arrival of words of vector information at said input of said respective memory during said loading operation, and is controlled to be alternately set and reset during substantially respective halves of said reading operation by said control means.

4. The arrangement of claim 3, wherein said control means includes a read control flip-flop having outputs coupled to said set and reset inputs of said address means flip-flops, and responsive to first and second control signals for alternating the state of each of said address means flip-flops during the reading cycle of its respective memory between set and reset conditions; and a read/write control flip-flop, responsive to said second control signal and having an output coupled to said address means flip-flops, for selecting the address means flip-flop which is controlled by said read control flip-flop.

5. The arrangement of claim 4, wherein said read/write control flip-flop output is further coupled to said steering means, for controlling the steering of said alternate words of said first and second vector information signals to one of said memories.

6. A method of formatting two simultaneous sequences of digital ultrasound vector information words for a digital scan converter comprising the steps of:
(a) selecting words alternately from each sequence to form a single sequence of interleaved words of said two sequences;
(b) storing said single sequence in consecutive locations of a memory;
(c) reading out even address locations of said memory to form a first sequence of output vector words for transmittal to said scan converter; and
(d) reading out odd address locations of said memory to form a second sequence of output vector words for transmittal to said scan converter.

7. The method of claim 6, further comprising the steps of:
(e) during steps (a) and (b), reading out even address locations of a second memory to form a third sequence of output vector words for transmittal to said scan converter, then reading out odd address locations of said second memory to form a fourth sequence of output vector words for transmittal to said scan converter; and
(f) during steps (c) and (d), selecting words alternately from each simultaneous sequence to form a single sequence of interleaved words of said two sequences and storing said single sequence in consecutive locations of said second memory.

8. The method of claim 7, wherein said simultaneous sequences are of the form $A_1, A_2, A_3 \ldots A_n$ and $B_1, B_2, B_3 \ldots B_n$, respectively; said single sequences are of the form $A_1, B_1, A_2, B_2, A_3, B_3 \ldots A_n, B_n$; said first and third sequences are of the form $A_1, A_2, A_3 \ldots A_n$; and said second and fourth sequences are of the form $B_1, B_2, B_3 \ldots B_n$.

* * * * *